(12) United States Patent
Pandey

(10) Patent No.: US 12,519,141 B2
(45) Date of Patent: Jan. 6, 2026

(54) METHANE-ASSISTED METAL ION BATTERY

(71) Applicant: L&T TECHNOLOGY SERVICES LIMITED, Chennai (IN)

(72) Inventor: Indu Pandey, Bhadohi (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 481 days.

(21) Appl. No.: 18/072,736

(22) Filed: Dec. 1, 2022

(65) Prior Publication Data

US 2024/0088451 A1    Mar. 14, 2024

(30) Foreign Application Priority Data

Sep. 12, 2022  (IN) .............................. 202241052039

(51) Int. Cl.
  *H01M 10/26*    (2006.01)
  *H01M 4/02*     (2006.01)
  (Continued)

(52) U.S. Cl.
  CPC ........... *H01M 10/26* (2013.01); *H01M 4/583* (2013.01); *H01M 50/124* (2021.01);
  (Continued)

(58) Field of Classification Search
  CPC .... H01M 10/26; H01M 4/583; H01M 50/124; H01M 50/138; H01M 50/46;
  (Continued)

(56) References Cited

U.S. PATENT DOCUMENTS

| | | | |
|---|---|---|---|
| 2020/0350643 A1 | 11/2020 | Kaneko et al. | |
| 2022/0209322 A1 | 6/2022 | Heo et al. | |

FOREIGN PATENT DOCUMENTS

| | | | |
|---|---|---|---|
| CN | 103943373 A | 7/2014 | |
| CN | 214705980 U | 11/2021 | |

(Continued)

OTHER PUBLICATIONS

Haoran Liu, Shuangrui Shi, Zhenhua Wang, Yunhu Han, Wei Huang; Recent Advances in Metal—Gas Batteries with Carbon-Based Nonprecious Metal Catalysts (https://onlinelibrary.wiley.com/doi/abs/10.1002/smll.202103747); Dec. 3, 2021.

(Continued)

*Primary Examiner* — Helen Oi K Conley
(74) *Attorney, Agent, or Firm* — Kendal M. Sheets

(57) ABSTRACT

This disclosure relates to a methane-assisted metal ion battery. The methane-assisted metal ion battery includes an electrolyte including a salt of a metal in aqueous state. The metal is selected from an alkali metal, an alkali earth metal, a transition metal, or a combination thereof. The methane-assisted metal ion battery further includes a positive electrode including a compound of the metal. The positive electrode is in contact with the electrolyte. The methane-assisted metal ion battery further includes a negative electrode electrically coupled to the positive electrode. The negative electrode includes an electrocatalyst and is configured to reduce atmospheric methane to generate carbon nanoparticles and hydrogen molecules ($H_2$) when the battery is charging and to oxidize hydrogen molecules ($H_2$) to generate hydrogen ions ($H^+$) and free electrons when the battery is discharging. The methane-assisted metal ion battery further includes a separator including a permeable membrane.

20 Claims, 3 Drawing Sheets

(51) Int. Cl.
   *H01M 4/583* (2010.01)
   *H01M 50/124* (2021.01)
   *H01M 50/138* (2021.01)
   *H01M 50/46* (2021.01)

(52) U.S. Cl.
   CPC ......... *H01M 50/138* (2021.01); *H01M 50/46* (2021.01); *H01M 2004/027* (2013.01); *H01M 2300/0002* (2013.01)

(58) Field of Classification Search
   CPC ... H01M 2004/027; H01M 2300/0002; H01M 4/9041; H01M 4/9075; H01M 12/08
   See application file for complete search history.

(56) References Cited

FOREIGN PATENT DOCUMENTS

| | | |
|---|---|---|
| CN | 114270586 A | 4/2022 |
| CN | 114360917 A | 4/2022 |
| CN | 114667626 A | 6/2022 |
| KR | 101519333 B1 | 5/2015 |

OTHER PUBLICATIONS

Mohammed M. Obeid Mohammed, Dongyuan Ni, Peng-Hu Du, and Qiang Sun; Design of Three-Dimensional Metallic Biphenylene Networks for Na-Ion Battery Anodes with a Record High Capacity; Jul. 11, 2022; ACS Appl. Mater. Interfaces 2022, 14, 28, 32043-32055.

Mirtha A.O.Lourenço; Moisés L.Pintob; Joãopiresc; José R.B. Gomes; Paulaferreiraa; carbonization of periodic mesoporous phenylene- and biphenylene-silicas for co2/ch4 separation (https://www.sciencedirect.com/science/article/abs/pii/S0008622317303895); vol. 119, Aug. 2017, pp. 267-277.

Kin Gao, Huibiao Liu, Dan Wang, and Jin Zhang; Graphdiyne: synthesis, properties, and applications; Jan. 4, 2019.

Jian Li, Xin Gao, Lei Zhu, Mohamed Nawfal Ghazzal, Jin Zhang, Chen-Ho Tung and Li-Zhu Wu; Graphdiyne for crucial gas involved catalytic reactions in energy conversion applications (https://pubs.rsc.org/en/content/articlelanding/2020/ee/c9ee03558c).

Kancharlapalli Srinivasu, Swapan Ghosh; Graphyne and Graphdiyne: Promising Materials for Nanoelectronics and Energy Storage Applications; February 2012The Journal of Physical Chemistry C 116(9):5951-5956.

Jiashu Yuan, Cuijuanzhang, Qianyuanqiu, Zheng-Zepan, Lijunfan, Yichengzhao, Yongdanli; Highly selective metal-organic framework-based (MOF-5) separator for non-aqueous redox flow battery; vol. 433, Part 2, Apr. 1, 2022, 133564.

Wenhui Xu, Yuhong Chen, Mingxia Song, Xiaocong Liu, Yingjie Zhao, Meiling Zhang, and Cairong Zhang; First-Principles Study on Methane (CH4) Storage Properties of Graphdiyne; J. Phys. Chem. C 2020, 124, 15, 8110-8118; Mar. 26, 2020.

Wenhui Xu, Yuhong Chen, Yingjie Zhao, Meiling Zhang, Ranran Tian & Cairong Zhang; Methane adsorption properties of N-doped graphdiyne: a first-principles study; 32, pp. 1517-1527 (2021).

METHANE-ASSISTED METAL ION BATTERY

TECHNICAL FIELD

This disclosure relates generally to metal ion batteries, and more particularly to a methane-assisted metal ion battery.

BACKGROUND

Greenhouse gases such as, carbon dioxide ($CO_2$) and methane ($CH_4$) are a major factor in global warming and climate change. While $CO_2$ is the most abundant greenhouse gas in the atmosphere, methane has a higher warming potential. Thus, it is as important to reduce methane concentration in the atmosphere as it is to reduce $CO_2$.

Currently, batteries based on zero emission and zero carbon foot print such as, metal-$CO_2$ batteries, consisting of a metal (e.g., Li, Na, Al, and Zn) electrode and a $CO_2$ fixation electrode with an appropriate electrolyte (e.g., organic or aqueous form), are emerging as a promising technology to integrate $CO_2$ utilization with metal-air batteries. However, aqueous metal-$CO_2$ batteries require an additional membrane to maintain various electrochemical functions between anolyte and catholyte, leading to extra complexities for cell fabrication and slow kinetics associated with the poor membrane ionic conductivity. Conventional batteries including lithium-ion, lead-acid, redox-flow and liquid-metal batteries show promise for grid-scale storage, but such batteries are lagging in meeting the grid-scale storage requirements such as, low cost, long cycle life, reliable safety, and reasonable energy density for cost and carbon footprint reduction.

Moreover, battery technology assisted by methane is not known in the present state of art. Graphdiyne is a carbon allotrope that is capable of adsorbing methane. However, in the present state of art, batteries using graphdiyne for capturing methane do not exist. Further, in the present state of art, batteries with means for capturing methane exist. However, such batteries capture methane and other gases released through electrochemical reactions inside the battery. Batteries capturing atmospheric methane and using the captured methane for recharging do not exist. There is, therefore, a need in the present state of art for metal ion batteries capable of capturing atmospheric methane for use in recharging.

SUMMARY

In one embodiment, a methane-assisted metal ion battery is disclosed. In one example, the methane-assisted metal ion battery may include an electrolyte comprising a salt of a metal in aqueous state. The metal may be selected from an alkali metal, an alkali earth metal, a transition metal, or a combination thereof. The methane-assisted metal ion battery may further include a positive electrode including a compound of the metal. The positive electrode may be in contact with the electrolyte and may be configured to oxidize ions of the metal in the electrolyte to generate a metal hydroxide when the battery is charging. The metal hydroxide may be deposited on surface of the positive electrode. The positive electrode may be further configured to reduce the metal hydroxide to generate metal ions when the battery is discharging. The metal ions may be released in the electrolyte. The methane-assisted metal ion battery may further include a negative electrode electrically coupled to the positive electrode. The negative electrode may be in contact with the electrolyte. The negative electrode may include an electrocatalyst and may be configured to reduce atmospheric methane to generate carbon nanoparticles and hydrogen molecules ($H_2$) when the battery is charging. The carbon nanoparticles may be configured to capture atmospheric methane. The negative electrode may be further configured to oxidize hydrogen molecules ($H_2$) to generate hydrogen ions ($H^+$) and free electrons when the battery is discharging. The hydrogen ions ($H^+$) and the free electrons may be released in the electrolyte. The methane-assisted metal ion battery may further include a separator including a permeable membrane. The separator may be positioned between the positive electrode and the negative electrode.

In one embodiment, a method of assembling a methane-assisted metal ion battery is disclosed. In one example, the method may include electrically coupling a positive electrode with a negative electrode. The positive electrode may include a compound of a metal. The negative electrode may include an electrocatalyst and may be configured to reduce atmospheric methane to generate carbon nanoparticles and hydrogen molecules ($H_2$) when the battery is charging. The carbon nanoparticles may be configured to capture atmospheric methane. The negative electrode may be further configured to oxidize hydrogen molecules ($H_2$) to generate hydrogen ions ($H^+$) and free electrons when the battery is discharging. The method may further include disposing the positive electrode and the negative electrode in contact with an electrolyte. The electrolyte may include a salt of the metal in aqueous state. The method may further include positioning a separator between the positive electrode and the negative electrode of the battery. The separator may include a permeable membrane.

In one embodiment, a composition for a negative electrode of a metal ion battery is disclosed. In one example, the composition may include an electrocatalyst configured to accelerate reduction of atmospheric methane to generate carbon nanoparticles and hydrogen molecules ($H_2$) when the battery is charging. The carbon nanoparticles may be configured to capture atmospheric methane. The electrocatalyst may be further configured to accelerate oxidation of hydrogen molecules ($H_2$) to generate hydrogen ions ($H^+$) and free electrons when the battery is discharging. The hydrogen ions ($H^+$) and free electrons may be released into the electrolyte.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
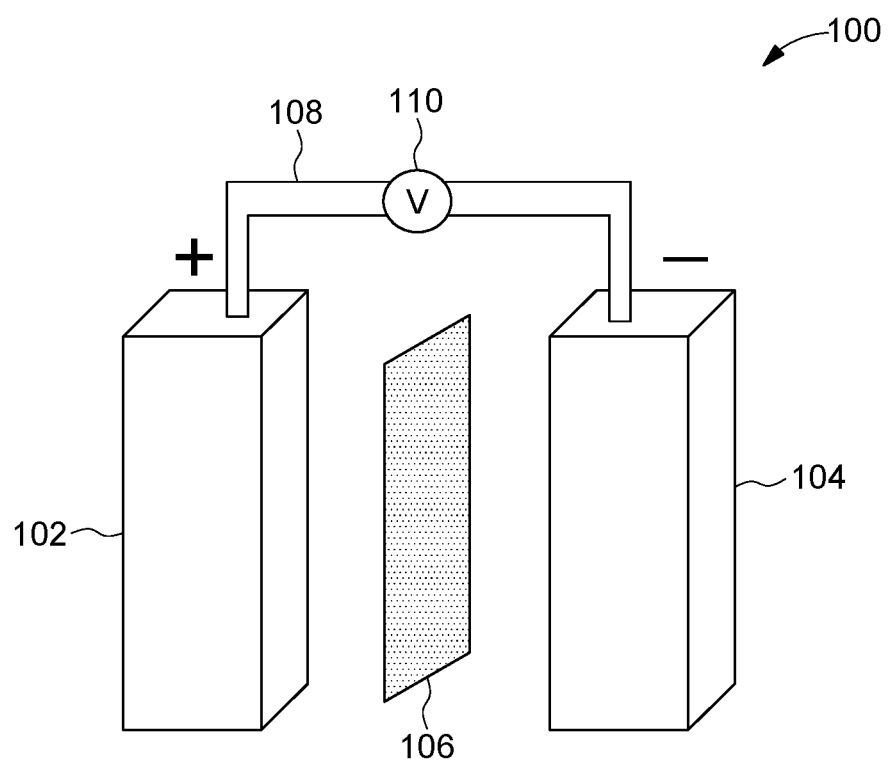
FIG. 1 illustrates an exemplary methane-assisted metal ion battery during discharge, in accordance with some embodiments.

Referring now to FIG. 1, an exemplary methane-assisted metal ion battery 100 during discharge is illustrated, in accordance with some embodiments. The methane-assisted metal ion battery 100 may include a positive electrode 102, a negative electrode 104, and a separator 106. The separator 106 may be positioned between the positive electrode 102 and the negative electrode 104.

The positive electrode 102 may include a metal or a metal compound. By way of an example, the metal may be selected from an alkali metal (such as, lithium (Li), sodium (Na), potassium (K), or the like), an alkali earth metal (such as, magnesium (Mg), calcium (Ca), or the like), a transition metal (such as, manganese (Mn), nickel (Ni), cobalt (Co), zinc (Zn), or the like), or a combination thereof. The negative electrode 104 may include an electrocatalyst. By way of an example, the electrocatalyst may include an iron catalyst and a copper catalyst coated on a gallium nitride nanotube doped with zinc oxide nanoparticles. In one embodiment, the negative electrode 104 is composed of Bipheneylene-graphdiyne. Further, the separator 106 may include a permeable membrane. By way of an example, the permeable membrane may be composed of a glass fiber coated with a Metal-Organic Framework (MOF) film.

The positive electrode 102 and the negative electrode 104 may be electrically coupled through an external circuit 108. The methane-assisted metal ion battery 100 may be used to supply power to a load device 110 when discharging. The load device 110 may be a consumer electronic device (e.g., a smartphone, a laptop, small and large electrical appliances, wireless headphones, toys, etc.), an Electric Vehicle (EV), or an industrial equipment. The methane-assisted metal ion battery 100 may be serially connected or connected in parallel with other similar methane-assisted metal ion batteries to produce a greater voltage output and power density if required by the load device 110.

In an embodiment, each of the positive electrode 102, the negative electrode 104, and the separator 106 may be in form of a sheet rolled on top of each other to form a battery with cylindrical shape. Size and shape of the methane-assisted metal ion battery 100 may vary based on a specific application for which the methane-assisted metal ion battery 100 may be designed. For example, the size, capacity, and power-output specifications of the methane-assisted metal ion battery 100 for use in EVs may be different from those used for powering hand-held consumer electronic devices.

Further, each of the positive electrode 102, the negative electrode 104, and the separator 106 may be disposed in an electrolyte. The electrolyte may include a salt of the metal in aqueous state. As will be appreciated, the metal salt may dissociate into free ions in the aqueous state. In some embodiments, the electrolyte may be in form of a paste disposed through the separator 106 between the positive electrode 102 and the negative electrode 104. In an embodiment, the salt of the metal may be a sulfate salt. It may be noted that metal sulfates are inexpensive salts with high solubility in water and good electrochemical stability.

The positive electrode 102 may be configured to oxidize ions of the metal in the electrolyte to generate a metal hydroxide when the methane-assisted metal ion battery 100 is charging. The metal hydroxide may be deposited on surface of the positive electrode 102. Further, the positive electrode 102 may be configured to reduce the metal hydroxide deposited on the surface to generate metal ions, when the methane-assisted metal ion battery 100 is discharging. The metal ions may be released in the electrolyte.

The negative electrode 104 may be configured to reduce atmospheric methane to generate carbon nanoparticles and hydrogen molecules ($H_2$) when the methane-assisted metal ion battery 100 is charging. The carbon nanoparticles may be deposited on the negative electrode 104 and may be configured to further capture atmospheric methane. It should be noted that the carbon nanoparticles may be chiral compounds with chiral selectivity for atmospheric methane. Due to the chiral selectivity for atmospheric methane, the carbon nanoparticles prevent capture of other gases. Also, due to the chiral selectivity of the carbon nanoparticles, life of the methane-assisted metal ion battery 100 may be enhanced as the product of the reaction at the negative electrode 104 (i.e., the carbon nanoparticles) is used cyclically to capture more reactant (i.e., atmospheric methane). By way of an example, the chiral compounds may be selected from a group including, but not limited to, chiral carbon nanotubes (for example, single walled, double walled, or multiple walled chiral carbon nanotubes), graphene, graphdiyne, carbon dots, and fullerenes.

Further, the negative electrode 104 may be configured to oxidize hydrogen molecules ($H_2$) to generate hydrogen ions ($H^+$) and free electrons when the methane-assisted metal ion battery 100 is discharging. The hydrogen ions ($H^+$) and the free electrons may be released in the electrolyte. Consequently, the free electrons generated may generate an electric current through the external circuit 108. The negative electrode 104 may function in multi-model ways such as, but not limited to, a photovoltaic cell, a piezoelectric cell, and a pyroelectric cell.

During charging of the methane-assisted metal ion battery 100 at the positive electrode 102, metal ions in the electrolyte may be oxidized to generate metal hydroxide, in accordance with chemical equation (1).

$$M^+ + H_2O(\text{moisture}) \rightarrow MOH + H_2 \tag{1}$$

During charging of the methane-assisted metal ion battery 100 at the negative electrode 104, atmospheric methane may be reduced to generate carbon nanoparticles and hydrogen molecules ($H_2$), in accordance with chemical equation (2).

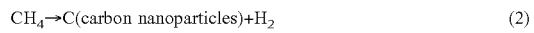
$$CH_4 \rightarrow C(\text{carbon nanoparticles}) + H_2 \tag{2}$$

During discharging of the methane-assisted metal ion battery 100 at the positive electrode 102, the metal hydroxide deposited on the surface may be reduced to generate metal ions, in accordance with chemical equation (3).

$$MOH + H_2 \rightarrow M^+ + H_2O \tag{3}$$

During discharging of the methane-assisted metal ion battery 100 at the negative electrode 104, hydrogen molecules ($H_2$) may be oxidized to generate hydrogen ions ($H^+$) and free electrons, in accordance with chemical equation (4).

$$H_2 \rightarrow 2H^+ + e^- \tag{4}$$

Overall chemical operation of the methane-assisted metal ion battery 100 may be represented as chemical equation (5).

$$M^+ + 2H_2O/CH_4 \leftrightarrow MOH + H_2 + H^+ + C \quad (5)$$

Figure 2:
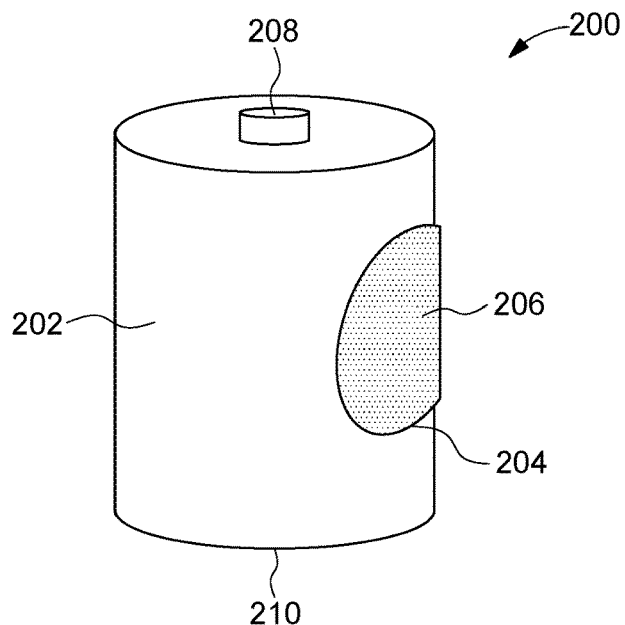
FIG. 2 illustrates an exemplary housing unit of the methane-assisted metal ion battery, in accordance with some embodiments.

Referring now to FIG. 2, an exemplary housing unit 200 of the methane-assisted metal ion battery (such as, the methane-assisted metal ion battery 100) is illustrated, in accordance with some embodiments. The housing unit 200 may include a housing 202 of the methane-assisted metal ion battery. In some embodiments, the housing 200 may be cylindrical in shape to provide a greater surface area for capturing atmospheric methane. By way of an example, the housing 202 may be composed of aluminum, aluminum alloy sheets, nickel-coated steels, or the like. As previously explained, the methane-assisted metal ion battery may include electrodes (such as, the positive electrode 102 and the negative electrode 104) and an electrolyte. The housing 202 may be configured to prevent any contact of the electrodes and the electrolyte with atmospheric oxygen. In some exemplary scenarios, any contact of the positive electrode with oxygen may cause the methane-assisted metal ion battery to explode. Thus, the housing 202 may provide a zero oxygen environment within the methane-assisted metal ion battery.

Further, the housing unit 200 may include a window 204 configured to capture atmospheric methane and supply the captured atmospheric methane to the negative electrode (for example, the negative electrode 104) of the methane-assisted metal ion battery. The window may be of various shapes, such as, spherical, square, rectangular, etc. It should be note that size and shape of the window 204 may be based on size and shape of the housing 202. For example, in some embodiments, the shape of the window 204 may be spherical when the shape of the housing 202 is cylindrical. In some other embodiments, the shape of the window 204 may be square or rectangular when the shape of the housing 202 is cuboidal. In yet another embodiment, the shape of the window 204 may be completely independent of the shape of the housing 202. Moreover, only a single window (i.e., the window 204) is shown for ease of explanation. However, the housing unit 200 may not be limited to a single window and may include one or more windows similar to the window 204.

The window 204 may be covered by an absorbent membrane 206 configured to absorb atmospheric moisture. In some embodiments, the absorbent membrane 206 may include a super absorbent polymer (SAP) membrane doped with Bismuth-doped hafnia-yttria-alumina-silica based fiber (for example, in a mass ratio of about 1:1). In such embodiments, the SAP membrane may be selected from a group including, but not limited to, poly(ethylene-co-1-octene), poly(1-decene-co-divinylbenzene), poly(divinylbenzene), poly(phenylacetylene), Boron-substituted Covalent Organic Polymer pitch, and a combination thereof. In some embodiments, the SAP membrane may include a surface area range of about 25.1 to about 3.11 [m2/g]BET, a pore size in a range of about 8.4 to about 4.5 nm, and a pore volume of about 0.5 cm3/g.

Additionally, the housing unit 200 may include a positive terminal 208 and a negative terminal 210. When connected in an external circuit (such as, the external circuit 108), the positive terminal 208 may be electrically coupled with the negative terminal 210 through an electrically conductive material and may enable the methane-assisted metal ion battery to power a load device (such as, the load device 110).

Figure 3:
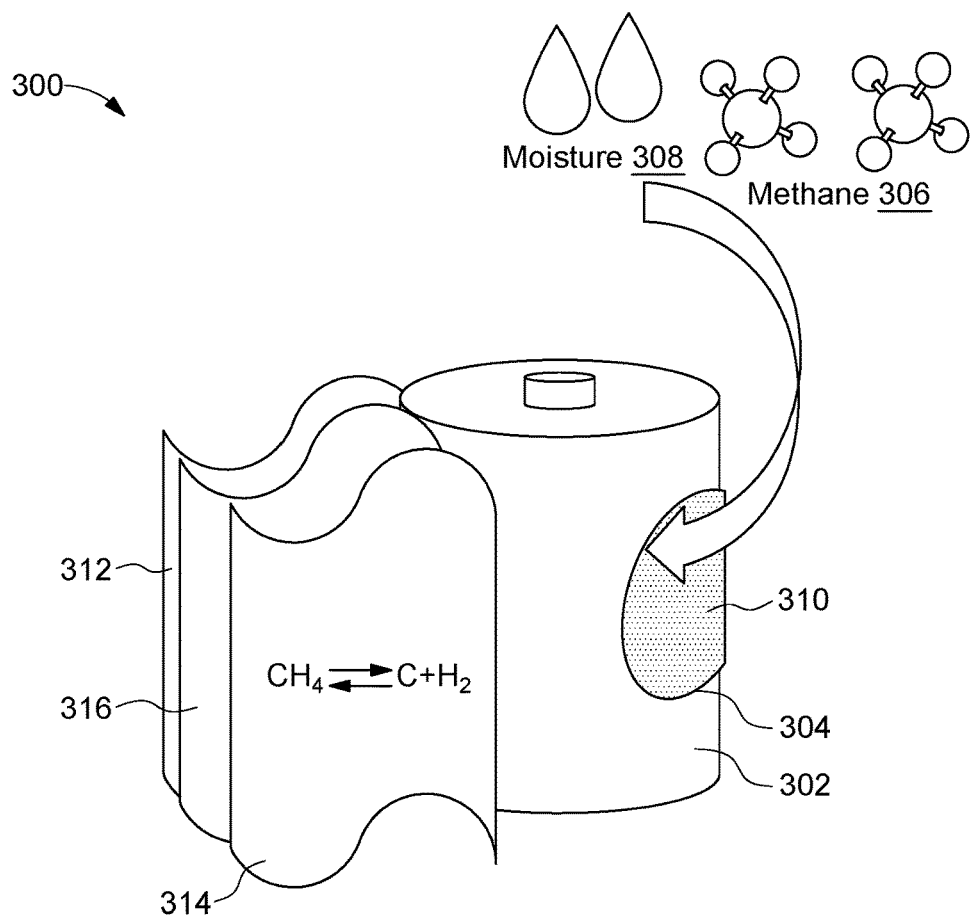
FIG. 3 illustrates a methane capture mechanism of the methane-assisted metal ion battery, in accordance with some embodiments.

Referring now to FIG. 3, a methane capture mechanism 300 of the methane-assisted metal ion battery (such as, the methane-assisted metal ion battery 100) is illustrated, in accordance with some embodiments. The methane-assisted metal ion battery may include a housing 302 (analogous to the housing 202) that may be in contact with external environment. A window 304 (analogous to the window 204) may be provided on the housing to allow for capture of atmospheric methane. The methane-assisted metal ion battery may capture atmospheric air from external environment through the window 304. By way of an example, the atmospheric air may include methane 306 and moisture 308. The window 304 may be covered with an absorbent membrane 310 configured to absorb the moisture 308.

The metal ion battery may further include a positive electrode 312 (analogous to the positive electrode 102), a negative electrode 314 (analogous to the negative electrode 104), and a separator 316 (analogous to the separator 106) within the housing 302. Within the housing 302, the metal ion battery may further include an electrolyte (not shown in the figure) in contact with each of the positive electrode 312, the negative electrode 314, and the separator 316. Inside the metal ion battery, the captured methane 306 may be supplied to the negative electrode 314. The negative electrode 314 may include a composition. The composition may include an electrocatalyst. By way of an example, the electrocatalyst may be an iron catalyst and a copper catalyst coated on a gallium nitride nanotube doped with zinc oxide nanoparticles.

When the methane-assisted metal ion battery is charging, the negative electrode 314 may be configured to reduce atmospheric methane to generate carbon nanoparticles and hydrogen molecules ($H_2$). It may be noted that negative electrode 314 may be configured to reduce methane may at room temperature (ranging from about 25° C. to about 35° C.). The carbon nanoparticles may be configured to capture atmospheric methane by enhancing surface area and adsorption capacity. It should be noted that the carbon nanoparticles may be chiral compounds with chiral selectivity for atmospheric methane. Due to the chiral selectivity of the carbon nanoparticles, gases other than methane will not get captured. For example, capturing of carbon dioxide ($CO_2$) by a metal ion battery may lead to release of oxygen gas inside the battery. This may cause an explosion in the battery if the metal of the positive electrode 312 comes in contact with oxygen. Therefore, the chiral selectivity of the carbon nanoparticles is essential to maintain an oxygen-free environment within the methane-assisted metal ion battery and to enable normal operation of the methane-assisted metal ion battery at high temperatures.

Also, when the methane-assisted metal ion battery is charging, the positive electrode 312 may be configured to oxidize ions of the metal in the electrolyte to generate a metal hydroxide when the battery is charging. The metal hydroxide may be deposited on surface of the positive electrode 312.

Further, when the methane-assisted metal ion battery is discharging, the negative electrode 314 may be configured to oxidize hydrogen molecules ($H_2$) to generate hydrogen ions ($H^+$) and free electrons. The hydrogen ions ($H^+$) and the free electrons may be released in the electrolyte. The free electrons may cause the methane-assisted metal ion battery to generate an electric current, enabling the methane-assisted metal ion battery to power a load device (such as, the load device 110) in an external circuit (such as, the external circuit 108).

Also, when the methane-assisted metal ion battery is discharging, the positive electrode 312 may be configured to reduce the metal hydroxide to generate metal ions. The metal ions may be released in the electrolyte. Thus, a two-step reaction may take place in the methane-assisted metal ion battery both when the battery is in a charging phase and when the battery is in a discharging phase. It should be noted that the methane-assisted metal ion battery may operate with high energy density and high capacity even at low temperature (about −10° C.).

Figure 4:
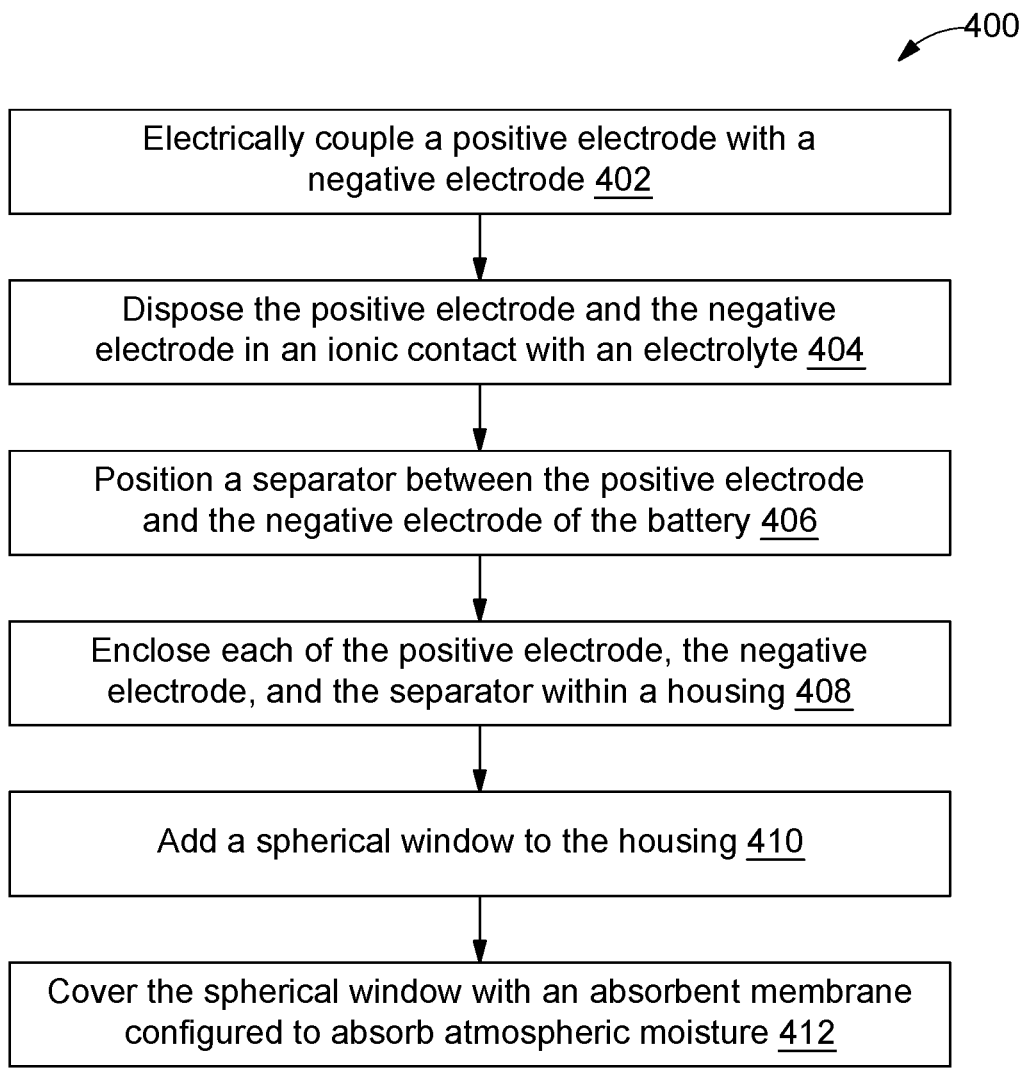
FIG. 4 illustrates a flow diagram of an exemplary method for assembling a methane-assisted metal ion battery, in accordance with some embodiments.

Referring now to FIG. 4, an exemplary method 400 for assembling a methane-assisted metal ion battery (such as, the methane-assisted metal ion battery 100) is depicted via a flowchart, in accordance with some embodiments. The method 400 may include electrically coupling a positive electrode (such as, the positive electrode 312) with a negative electrode (such as, the negative electrode 314), at step 402. The positive electrode may include a compound of a metal. The negative electrode may include an electrocatalyst and may be configured to reduce atmospheric methane to generate carbon nanoparticles and hydrogen molecules ($H_2$) when the battery is charging. The carbon nanoparticles may be configured to capture atmospheric methane. It should be noted that the carbon nanoparticles may be chiral compounds with chiral selectivity for atmospheric methane. By way of an example, the chiral compounds may be selected from a group including, but not limited to, chiral carbon nanotubes (for example, single walled, double walled, or multiple walled chiral carbon nanotubes), graphene, graphdiyne, carbon dots, and fullerenes. The negative electrode may be further configured to oxidize hydrogen molecules ($H_2$) to generate hydrogen ions ($H^+$) and free electrons when the battery is discharging.

Further, the method 400 may include disposing the positive electrode and the negative electrode in contact with an electrolyte, at step 404. The electrolyte may include a salt of the metal in aqueous state. By way of an example, the metal salt may be a metal sulfate. Further, the method 400 may include positioning a separator (such as, the separator 316) between the positive electrode and the negative electrode of the battery, at step 406. The separator may include a permeable membrane. By way of an example, the permeable membrane may be composed of a glass fiber coated with a Metal-Organic Framework (MOF) film.

Further, the method 400 may include enclosing each of the positive electrode, the negative electrode, and the separator within a housing (such as, the housing 302), at step 408. It may be noted that the housing may be metallic (for example, aluminum, nickel-coated steel, etc.) or non-metallic (for example, plastics, rubber, fiber, etc.). In a preferred embodiment, the housing may be composed of aluminum. Further, the method 400 may include adding a window (such as, the window 304) to the housing, at step 410. The window may be configured to capture atmospheric methane and to supply the atmospheric methane to the negative electrode.

Further, the method 400 may include covering the window with an absorbent membrane configured to absorb atmospheric moisture, at step 412. In some embodiments, the absorbent membrane may include a super absorbent polymer (SAP) membrane doped with Bismuth-doped hafnia-yttria-alumina-silica based fiber. The SAP membrane may be selected from a group including poly(ethylene-co-1-octene), poly(1-decene-co-divinylbenzene), poly(divinylbenzene), poly(phenylacetylene), Boron-substituted Covalent Organic Polymer pitch, and a combination thereof.

Thus, the disclosed methane-assisted metal ion battery tries to overcome the technical problem of providing sustainable rechargeable batteries capable of methane sequestration. The methane-assisted metal ion battery captures atmospheric methane and uses the captured methane for recharging. The methane-assisted metal ion battery further provides an oxygen free environment for safe battery operation at high temperatures, avoiding the risk of explosion. Additionally, the disclosed methane-assisted metal ion battery is scalable, allowing methane capture on a large scale. The methane-assisted metal ion battery generates carbon nanoparticles from decomposition of methane. The carbon nanoparticles are capable of further adsorption of methane. Thus, the methane-assisted metal ion battery has an enhanced life as the product is becoming a part of further electrochemical reactions, implying production of lesser waste material inside the battery.

As will be appreciated by those skilled in the art, the techniques described in the various embodiments discussed above are not routine, or conventional, or well understood in the art. The techniques discussed above provide for assembling a methane-assisted metal ion battery. The techniques may first electrically couple a positive electrode with a negative electrode. The positive electrode may include a compound of a metal. The negative electrode may include an electrocatalyst and may be configured to reduce atmospheric methane to generate carbon nanoparticles and hydrogen molecules ($H_2$) when the battery is charging. The carbon nanoparticles may be configured to capture atmospheric methane. The negative electrode may be further configured to oxidize hydrogen molecules ($H_2$) to generate hydrogen ions ($H^+$) and free electrons when the battery is discharging. The techniques may then dispose the positive electrode and the negative electrode in contact with an electrolyte. The electrolyte may include a salt of the metal in aqueous state. The techniques may then position a separator between the positive electrode and the negative electrode of the battery. The separator may include a permeable membrane.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described a methane-assisted metal ion battery, a method of assembling the methane-assisted metal ion battery, and a composition of a negative electrode of the same. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It is intended that the disclosure and examples be considered as exemplary only, with a true scope and spirit of disclosed embodiments being indicated by the following claims.

What is claimed is:

1. A methane-assisted metal ion battery comprising:
    an electrolyte comprising a salt of a metal in aqueous state, wherein the metal is selected from an alkali metal, an alkali earth metal, a transition metal, or a combination thereof;
    a positive electrode comprising a compound of the metal, wherein the positive electrode is in contact with the electrolyte and is configured to:
        oxidize ions of the metal in the electrolyte to generate a metal hydroxide when the battery is charging, wherein the metal hydroxide is deposited on surface of the positive electrode; and
        reduce the metal hydroxide to generate metal ions, when the battery is discharging, wherein the metal ions are released in the electrolyte;
    a negative electrode electrically coupled to the positive electrode, wherein the negative electrode is in contact with the electrolyte, wherein the negative electrode comprises an electrocatalyst and is configured to:
        reduce atmospheric methane to generate carbon nanoparticles and hydrogen molecules ($H_2$) when the battery is charging, wherein the carbon nanoparticles are configured to capture atmospheric methane; and
        oxidize hydrogen molecules ($H_2$) to generate hydrogen ions ($H^+$) and free electrons when the battery is discharging, wherein the hydrogen ions ($H^+$) and the free electrons are released in the electrolyte; and
    a separator comprising a permeable membrane,
        wherein the separator is positioned between the positive electrode and the negative electrode.

2. The methane-assisted metal ion battery of claim 1, further comprising a housing configured to enclose each of the positive electrode, the negative electrode, and the separator.

3. The methane-assisted metal ion battery of claim 2, wherein the housing comprises a window, and wherein the window is configured to:
    capture atmospheric methane; and
    supply the atmospheric methane to the negative electrode.

4. The methane-assisted metal ion battery of claim 3, wherein the window is covered with an absorbent membrane configured to absorb atmospheric moisture.

5. The methane-assisted metal ion battery of claim 4, wherein the absorbent membrane comprises a super absorbent polymer (SAP) membrane doped with Bismuth-doped hafnia-yttria-alumina-silica based fiber.

6. The methane-assisted metal ion battery of claim 5, wherein the SAP membrane is selected from a group comprising poly(ethylene-co-1-octene), poly(1-decene-co-divinylbenzene), poly(divinylbenzene), poly(phenylacetylene), Boron-substituted Covalent Organic Polymer pitch, and a combination thereof.

7. The methane-assisted metal ion battery of claim 1, wherein the carbon nanoparticles of the negative electrode are chiral compounds with chiral selectivity for atmospheric methane, and wherein the chiral compounds are selected from a group comprising chiral carbon nanotubes, graphene, graphdiyne, carbon dots, and fullerenes.

8. The methane-assisted metal ion battery of claim 1, wherein the electrocatalyst of the negative electrode comprises:
    an iron catalyst and a copper catalyst coated on a gallium nitride nanotube doped with zinc oxide nanoparticles.

9. The methane-assisted metal ion battery of claim 1, wherein the electrocatalyst of the negative electrode is further configured to absorb moisture.

10. The methane-assisted metal ion battery of claim 1, further configured to operate within a temperature range of −10° C. and above.

11. The methane-assisted metal ion battery of claim 1, wherein the carbon nanoparticles are deposited on a surface of the negative electrode.

12. A method of assembling a methane-assisted metal ion battery, the method comprising:
    electrically coupling a positive electrode with a negative electrode, wherein the positive electrode comprises a compound of a metal, and wherein the negative electrode comprises an electrocatalyst and is configured to:
        reduce atmospheric methane to generate carbon nanoparticles and hydrogen molecules ($H_2$) when the battery is charging, wherein the carbon nanoparticles are configured to capture atmospheric methane; and
        oxidize hydrogen molecules ($H_2$) to generate hydrogen ions ($H^+$) and free electrons when the battery is discharging;
    disposing the positive electrode and the negative electrode in contact with an electrolyte, wherein the electrolyte comprises a salt of the metal in aqueous state; and
    positioning a separator between the positive electrode and the negative electrode of the battery,
        wherein the separator comprises a permeable membrane.

13. The method of claim 12, further comprising enclosing each of the positive electrode, the negative electrode, and the separator within a housing.

14. The method of claim 13, further comprising adding a window to the housing, wherein the window is configured to:
    capture atmospheric methane; and
    supply the atmospheric methane to the negative electrode.

15. The method of claim 14, further comprising covering the window with an absorbent membrane configured to absorb atmospheric moisture.

16. The method of claim 15, wherein the absorbent membrane comprises a super absorbent polymer (SAP) membrane doped with Bismuth-doped hafnia-yttria-alumina-silica based fiber.

17. The method of claim 16, wherein the SAP membrane is selected from a group comprising poly(ethylene-co-1-octene), poly(1-decene-co-divinylbenzene), poly(divinylbenzene), poly(phenylacetylene), Boron-substituted Covalent Organic Polymer pitch, and a combination thereof.

18. A composition for a negative electrode of a metal ion battery, the composition comprising:
    an electrocatalyst configured to:
        accelerate reduction of atmospheric methane to generate carbon nanoparticles and hydrogen molecules ($H_2$) when the battery is charging, wherein the carbon nanoparticles are configured to capture atmospheric methane; and
        accelerate oxidation of hydrogen molecules ($H_2$) to generate hydrogen ions ($H^+$) and free electrons when the battery is discharging, wherein the hydrogen ions ($H^+$) and free electrons are released into the electrolyte.

19. The composition of claim 18, wherein the carbon nanoparticles of the negative electrode are chiral compounds with chiral selectivity for atmospheric methane, and wherein the chiral compounds are selected from a group comprising chiral carbon nanotubes, graphene, graphdiyne, carbon dots, and fullerenes.

20. The composition of claim 18, wherein the electrocatalyst of the negative electrode comprises an iron catalyst and a copper catalyst coated on gallium nitride nanotubes doped with zinc oxide nanoparticles.

\* \* \* \* \*